(12) United States Patent
Park et al.

(10) Patent No.: US 9,488,337 B2
(45) Date of Patent: Nov. 8, 2016

(54) LIGHT SHIELD CONNECTION FILM AND LIGHTING DEVICE INCLUDING THE SAME

(71) Applicant: LG ELECTRONICS INC., Seoul (KR)

(72) Inventors: Jungwoon Park, Seoul (KR); Jongjin Kim, Seoul (KR); Youngil Kim, Seoul (KR); Yongshu Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 14/470,043

(22) Filed: Aug. 27, 2014

(65) Prior Publication Data

US 2015/0077990 A1    Mar. 19, 2015

(30) Foreign Application Priority Data

Aug. 29, 2013    (KR) .................. 10-2013-0103373

(51) Int. Cl.

| | |
|---|---|
| *F21V 11/00* | (2015.01) |
| *F21Y 101/02* | (2006.01) |
| *F21Y 105/00* | (2016.01) |
| *G02F 1/1335* | (2006.01) |
| *F21V 8/00* | (2006.01) |
| *F21V 3/04* | (2006.01) |

(52) U.S. Cl.
CPC ............ *F21V 11/00* (2013.01); *G02B 6/0078* (2013.01); *F21V 3/049* (2013.01); *F21Y 2101/02* (2013.01); *F21Y 2105/00* (2013.01); *G02B 6/0036* (2013.01); *G02B 6/0051* (2013.01); *G02B 6/0061* (2013.01); *G02F 1/133606* (2013.01); *G02F 1/133611* (2013.01)

(58) Field of Classification Search
CPC ................................................... G02B 6/0031
See application file for complete search history.

(56) References Cited

U.S. PATENT DOCUMENTS

| | | | |
|---|---|---|---|
| 7,632,002 B1 | 12/2009 | Park et al. | |
| 2008/0101068 A1* | 5/2008 | Kitamura | G02B 6/0078 362/246 |
| 2011/0235308 A1* | 9/2011 | Kang | G02B 6/0068 362/97.2 |

FOREIGN PATENT DOCUMENTS

| | | |
|---|---|---|
| EP | 2 280 218 A1 | 2/2011 |
| EP | 2 369 373 A1 | 9/2011 |
| JP | 2004-170698 A | 6/2004 |

OTHER PUBLICATIONS

European Search Report issued in Application No. 14182422.7 dated Feb. 27, 2015.

* cited by examiner

*Primary Examiner* — Elmito Breval
(74) *Attorney, Agent, or Firm* — Ked & Associates, LLP

(57) ABSTRACT

Provided is a diffuser for a backlight and display device having the same. The display device may include a case, a display screen provided in the case, and a backlight provided behind the display screen. The backlight may include a first light panel, a second light panel provided adjacent the first light panel, and a diffuser provided over a boundary between the first and second light panels to diffuse light between the first and second light panels. The diffuser may have light blocking regions arranged in a prescribed pattern to diffuse the light.

20 Claims, 8 Drawing Sheets

LIGHT SHIELD CONNECTION FILM AND LIGHTING DEVICE INCLUDING THE SAME

CROSS-REFERENCE TO RELATED APPLICATION(S)

This application claims priority under 35 U.S.C. §119 to Korean Application No. 10-2013-0103373 filed in Korea on Aug. 29, 2013, whose entire disclosure is hereby incorporated by reference.

BACKGROUND

1. Field

Provided is a light shield connection film and a lighting device including the same.

2. Background

Light shield connection films and lighting devices including the same are known. However, they suffer from various disadvantages.

A liquid crystal display apparatus, a lighting apparatus, and the like serve to form a desired image or provide light using a light source. A light emitting unit including a variety of light emitting devices may be used as the light source.

Traditionally, methods of increasing a size of light emitting units have mainly been used to fabricate a large lighting devices (also referred to herein as light emitting modules), and therefore, increases in the size of the light emitting module is limited. In addition, in the case of the light emitting module in which a plurality of light emitting units are connected to one another, increase brightness is seen at boundaries of the light emitting units, thus causing generation of very bright lines. Therefore, light emitting modules having this type of configuration is difficult to fabricate without uneven light characteristics. Accordingly, improved methods of fabricating large light emitting modules are needed.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
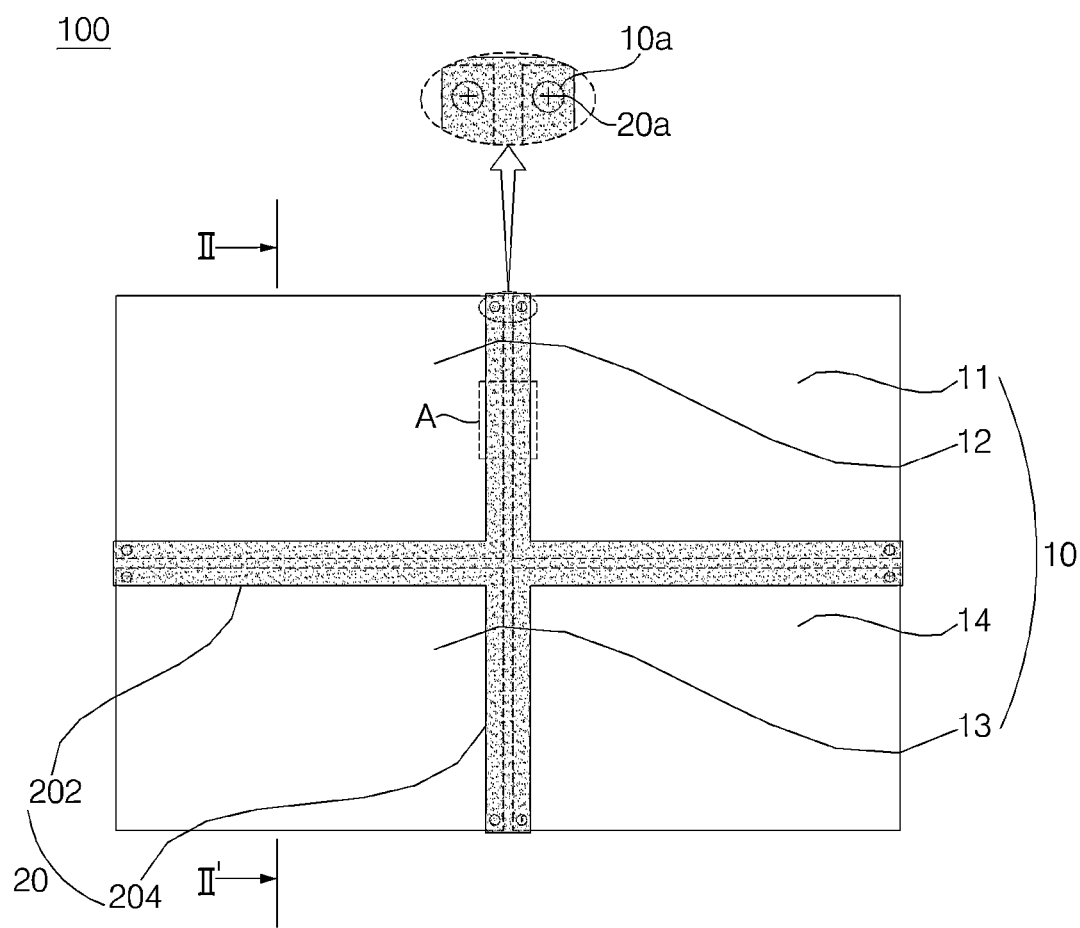
FIG. 1 is a plan view showing a light emitting module including a light shield connection film according to an embodiment of the present disclosure.

Reference will now be made in detail to the preferred embodiments of the present disclosure, examples of which are illustrated in the accompanying drawings. The present disclosure may, however, be embodied in many alternate forms and should not be construed as limited to the embodiments set forth herein.

For simplicity and clarity of description, illustration of components not associated with the description is omitted in the drawings, and the same or extremely similar elements are denoted by the same reference numerals throughout the specification. In addition, the thickness, area, and the like of elements in the drawings are expanded or contracted to aid in clear understanding of the elements, and it is to be understood that the thickness, area, and the like of the present disclosure are not limited to the illustration of the drawings.

It will be further understood that the term "include" is used to specify that any one component includes the other component, and does not preclude the presence or addition of one or more other components unless otherwise stated. In addition, when an element, such as a layer, film, region, plate, and the like, is referred to as being formed "on" another element, it can be "directly on" the other element or be indirectly formed with intervening elements therebetween. On the other hand, when an element, such as a layer, film, region, plate, and the like, is referred to as being formed "directly on" another element, this means that no element is interposed therebetween.

Hereinafter, a light shield connection film and a lighting device according to embodiments of the present disclosure will be described in detail with reference to the accompanying drawings.

Figure 2:
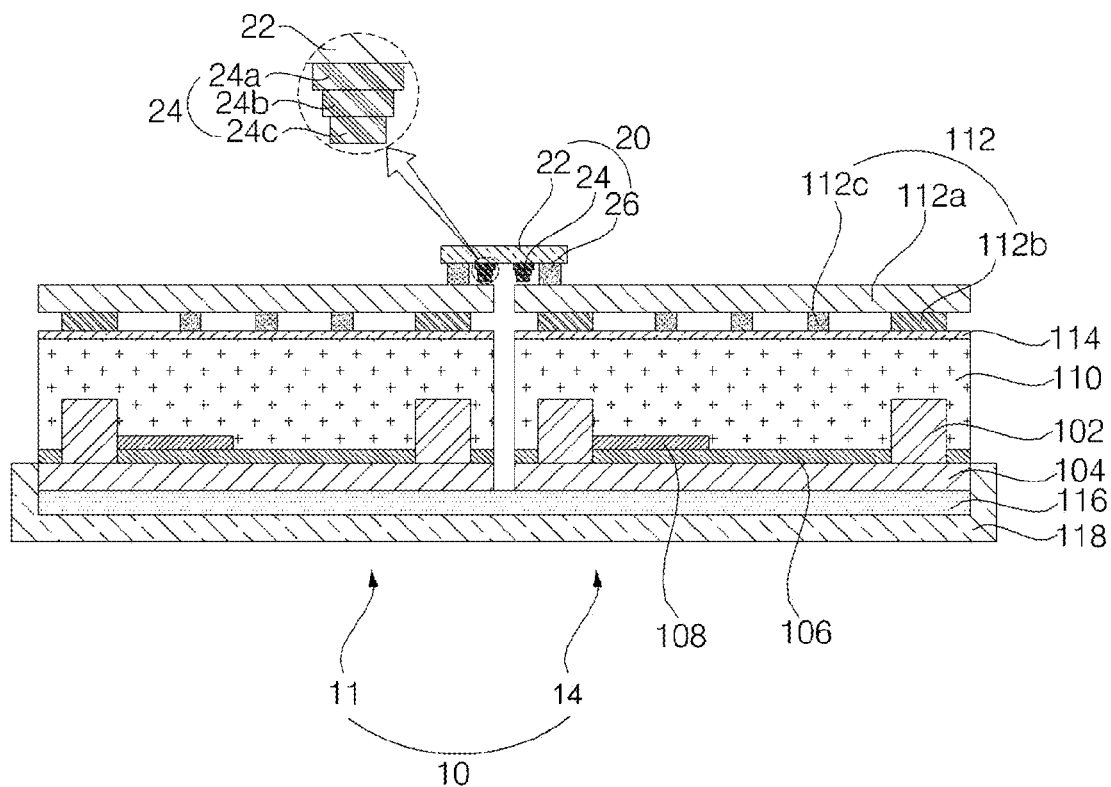
FIG. 2 is a sectional view taken along lines II-II' of FIG. 1.

FIG. 1 is a plan view showing a lighting device (also referred to herein as a light emitting module) including a light shield connection film according to an embodiment of the present disclosure, and FIG. 2 is a sectional view taken along lines II-II' of FIG. 1. The light emitting module 100 may include a plurality of light emitting units 10, and a light shield connection film 20 configured to interconnect neighboring light emitting units 10 among the plurality of light emitting units 10 at a boundary of the neighboring light emitting units 10 (e.g., at a portion where the neighboring light emitting units 10 adjoin each other). The light emitting units 10 may be referred to as light panels and the light shield connection film 20 may be referred to as a diffuser. The light shield connection film 20 serves to shield or diffuse light such that a bright line, generated as light emitted from the light emitting units 10 merges at the boundary of the neighboring light emitting units 10, is reduced. This will be described later in greater detail.

A plurality of light emitting units 10 may be provided. The drawings and the description illustrate the light emitting units 10 as including a first light emitting unit 11, a second light emitting unit 12, a third light emitting unit 13, and a fourth light emitting unit 14. In this case, the first light emitting unit 11 and the second light emitting unit 12 may adjoin each other in a first direction (a horizontal direction with respect to FIG. 1) to constitute one row, and the third light emitting unit 13 and the fourth light emitting unit 14 may adjoin each other in the first direction to constitute another row. In addition, the first light emitting unit 11 and the third light emitting unit 13 may adjoin each other in a second direction (a vertical direction with respect to FIG. 1) perpendicular to the first direction to constitute one column, and the second light emitting unit 12 and the fourth light emitting unit 14 may adjoin each other in the second direction to constitute another column. As such, if the light emitting units 10 define two rows or two columns, the respective light emitting units 10 may be more easily connected to an external circuit, for example. Moreover, it should be appreciated that the light panels 11, 12, 13, 14 may be positioned to abut an adjacent panel, or a prescribed distance or gap may be provided between adjoined panels.

However, the present disclosure is not limited to the above description. Alternatively, a variety of different numbers of light emitting units 10, such as two, three, five or more light emitting units 10, may be provided. In addition, a plurality of light emitting units 10 may be arranged in three or more rows or columns, or may be arranged in a special configuration so as not to define rows or columns. As such, the number, arrangement, and other configurations of the light emitting units 10 may be altered in various ways.

Each of the light emitting units 10 may include a light emitting device 102, a circuit board 104 electrically connected to the light emitting device 102, a reflective sheet 106 placed on the circuit board 104 and provided with a diffusion pattern 108, a light guide resin layer 110 configured to cover the light emitting device 102, and a light shield sheet 112 placed on the light guide resin layer 110. The light shield sheet 112 may have a prescribed elasticity. In addition, the light emitting unit 10 may further include an anti-permeation film 114 located between the light guide resin layer 110 and the light shield sheet 112. This will be described later in greater detail.

The circuit board 104 may be a board provided with wirings, circuit patterns, and other components to supply electrical signals to the light emitting device 102. The circuit board 104 may be a rigid Printed Circuit Board (PCB), a Metal Core Printed Circuit Board (MCPCB), or a Flexible Printed Circuit Board (FPCB), for example.

The light emitting device 102 electrically connected to the circuit board 104 may be a device capable of emitting light, which is fabricated via various configurations and methods. For instance, the light emitting device 102 may be a Light Emitting Diode (LED). The light emitting diode may exhibit excellent light conversion efficiency, thus achieving energy reduction. In addition, the light emitting diode may be eco-friendly and achieve reduction in volume. The drawing illustrates a vertical configuration in which the circuit board 104 constitutes a lower surface of the light emitting unit 10 and the light emitting device 102 is formed on the circuit board 104. However, the present disclosure is not limited thereto. Alternatively, the reflective sheet 106, a separate sheet or case, or the like, may constitute a lower surface of the light emitting unit 10, and at least one of the circuit board 104 and the light emitting device 102 may be configured laterally. This lateral configuration will be described later in greater detail with reference to FIG. 8.

The reflective sheet 106 may be placed on the circuit board 104 to reflect light that is emitted from the light emitting device 102 and directed to the circuit board 104. The reflective sheet 106 may be formed of a material having high reflectivity. For example, the reflective sheet 106 may include a white reflective sheet formed of a metal (more particularly, aluminum, silver, gold, or the like) or a metal oxide (more particularly, titanium oxide, silica, or the like). However, the present disclosure is not limited thereto, and the reflective sheet 106 may be formed of various other materials and have various configurations. The drawing illustrates an example in which the reflective sheet 106 is placed on a surface of the circuit board 104 facing the light shield sheet 112 to effectively reflect light emitted from the light emitting device 102, but the present disclosure is not limited thereto.

Additionally, the diffusion pattern 108 to diffuse light may be formed on an upper surface of the reflective sheet 106. The diffusion pattern 108 may be formed by applying a white ink including a white pigment, and may have various shapes. For instance, the diffusion pattern 108 may have a smaller size and density in a portion thereof close to the light emitting device 102 and may have a greater size and density in a portion thereof distant from the light emitting device 102. This may ensure uniform light diffusion. However, the present disclosure is not limited thereto.

The light guide resin layer 110 may be located to cover the circuit board 104 and the reflective sheet 106. The light guide resin layer 110 may be configured to cover the light emitting device 102, or may be formed at a lateral side of the light emitting device 102 to have the same or similar height as the light emitting device 102. The light guide resin layer 110 may contain a resin having high transmittance and a different index of refraction from that of air. In this way, the light guide resin layer 110 may guide light via total reflection based on a difference of the index of refraction with the air. For instance, the light guide resin layer 110 may be formed of a polyurethane based ultraviolet curing resin, and may have an index of refraction within a range of 1.3 to 1.5. However, the present disclosure is not limited thereto, and various alterations are possible. In addition, although the present embodiment illustrates a vertical configuration of the light emitting unit 10 in which the light guide resin layer 110 is located over the light emitting device 102, it will be appreciated that the light guide resin layer 110 may be located at a lateral side of the light emitting device 102 in a lateral configuration.

The anti-permeation film 114 may be placed on the light guide resin layer 110. The anti-permeation film 114 may prevent oxygen, moisture, and the like from the outside of the anti-permeation film 114 from permeating into the light guide resin layer 110 or toward the light emitting device 102. Thereby, the anti-permeation film 114 may prevent yellowing of the light guide resin layer 102 and enhance reliability. In addition, if the light guide resin layer 110 has high degree of tackiness (e.g., stickiness), the anti-permeation film 114 may act to minimize problems due to such high tackiness. The anti-permeation film 114 may be formed of various materials capable of blocking oxygen, moisture, and the like and minimizing problems due to high degree of tackiness. For instance, the anti-permeation film 114 may be formed of polyethylene-terephthalate (PET). However, the present disclosure is not limited thereto, and various alterations including omission of the anti-permeation film 114 are possible.

The light shield sheet 112 is located on the anti-permeation film 114 at a position proximate to the light emitting device 102. The light shield sheet 112 may serve to shield or diffuse light emitted from the light emitting device 102 and diffuse the light, thereby achieving uniform light distribution.

The light shield sheet 112 may include an elastic base member 112a, a light shield pattern 112b formed on the base member 112a, and an adhesive member 112c. The base member 112a may be formed of various materials capable of transmitting light and providing sufficient strength to support the light shield pattern 112b. The base member 112a may be formed of a resin material. For example, the base member 112a may be formed of a thermoplastic resin, such as polyethylene-terephthalate (PET), polycarbonate (PC), and the like. During a process, a back protection film (BPF) may be located on a surface of the base member 112a, on which the light shield pattern 112b and the adhesive member 112c are not formed, to protect the base member 112a. The back protection film may be removed after completion of a process of positioning the light shield sheet 112 on the light emitting unit 10.

The base member 112a may further include other additives to maintain physical properties and optical stability of an optical film. For instance, the base member 112 may contain at least one of an ultraviolet light absorber, infrared light absorber, anti-oxidant, heat stabilizer, selective wavelength absorber, flame retardant material, plasticizer, stabilizer, lubricant, colorant, fluorescent brightener, or antistatic agent. Various other known materials may also be used as these additives.

The light shield pattern 112b located on the base member 112a may serve to intercept and diffuse light at a portion proximate to the light emitting device 102, in order to achieve uniform diffusion of light emitted from the light emitting device 102. The light shield pattern 112b may be greater in size and density in a portion thereof proximate to the light emitting device 102 (e.g., in a portion thereof located over the light emitting device 102) and may gradually be reduced in size and density with increasing distance from the light emitting device 102. With this configuration, the light shield pattern 112b may intercept high intensity light in a portion where the light emitting device 102 is located to thereby diffuse the light to other portions thereof, thereby achieving a more uniform light distribution. A planar shape of the light shield pattern 112b may be selected or various other known shapes.

FIG. 2 illustrates a configuration in which the light shield pattern 112b is formed in a single layer on the base member 112a, but the present disclosure is not limited thereto. To enhance light shielding effects, the light shield pattern 112b may be formed by stacking two or more different layers one above another via double tone printing, and the like. For instance, a first layer of the light shield pattern 112b may contain a white pigment, and a second layer located on the first layer may contain a white pigment as well as a blue pigment. This may improve light shielding and diffusion effects, and the blue pigment contained in the second layer may provide yellow correction. However, the present disclosure is not limited thereto, and various alternations with regard to a stacking configuration of the light shield pattern are possible.

The adhesive member 112c serves to attach the light shield sheet 112 to the light guide resin layer 110 and the anti-permeation film 114. The adhesive member 112c may be formed of various known materials. For instance, the adhesive member 112c may be formed of a Pressure Sensitive Adhesive (PSA). The adhesive member 112c may be partially applied so as to minimize interference with a path of light. However, the present disclosure is not limited thereto, and various alternations with regard to the shape and constituent material of the adhesive member 112c are possible.

After the plurality of light emitting units 10 as described above is prepared, these light emitting units 10 may be secured to a case 118 via an adhesive layer 116 located on a rear surface of each light emitting unit (e.g., a lower surface in the drawing). As such, the plurality of light emitting units 10 (for example, the first to fourth light emitting units 11, 12, 13, and 14) may be integrally secured to the case 118 to constitute the light emitting module 100 (also referred to as a backlight). Various alterations with regard to the material of the adhesive layer 116 and the configuration of the case 118, for example, are possible. In addition, the plurality of light emitting units 10 may be integrally secured using various other configurations which may exclude the adhesive layer 116 and the case 118.

Light emitted from the plurality of light emitting units 10 merges at boundaries of neighboring light emitting units 10 (e.g., at portions where the first light emitting unit 11 and the second light emitting unit 12 adjoin each other, where the first light emitting unit 11 and the third light emitting unit 13 adjoin each other, where the second light emitting unit 12 and the fourth light emitting unit 14 adjoin each other, and where the third light emitting unit 13 and the fourth light emitting unit 14 adjoin each other). Accordingly, the boundaries of the neighboring light emitting units 10 may tend to be brighter than the other portions of the light emitting unit 10. Increased brightness in these areas may cause generation of, for example, bright lines or bright spots that may be visible to a viewer.

To prevent this problem, the light shield connection film 20 (also referred to herein as a diffuser) may be provided at the boundary of the neighboring light emitting units 10 to connect the light emitting units 10. The light shield connection film 20 may serve to prevent or minimize bright lines generated between the neighboring light emitting units 10 and also may serve to interconnect front surfaces of the plurality of light emitting units 10 for stable securing therebetween. This will be described later in greater detail.

The light shield connection film 20 may include a base member 22 (also referred to herein as a base plate or film) and a light shield pattern 24 (also referred to herein as a light diffusing material) located on the base member 22. In addition, the light shield connection film 20 may further include an adhesive member 26 located on the base member 22.

The base member 22 may be formed of various materials capable of transmitting light and providing sufficient strength to support the light shield pattern 24 as well as the light emitting units 10. The base member may be rigid. Alternatively, the base member 22 may be flexible, but have a prescribed amount of rigidity to provide sufficient structural support for the light emitting units 10. The base member 22 may be formed of a resin material. For example, the base member 22 may be formed of a thermoplastic resin, such as PET, PC, and the like. The base member 22 may be a translucent film. A back protection film (BPF) may be provided on a surface of the base member 22, on areas in which the light shield pattern 24 and the adhesive member 26 are not formed, to protect the base member 22. The back protection film may be removed after completion of a process of positioning the light shield connection film 20 on the light emitting unit 10.

The base member 22 may further include other additives to maintain physical properties and optical stability of an optical film. For instance, the base member 22 may contain at least one of an ultraviolet light absorber, infrared light absorber, anti-oxidant, heat stabilizer, selective wavelength absorber, flame retardant material, plasticizer, stabilizer, lubricant, colorant, fluorescent brightener, or antistatic agent. Various other known materials may also be used as these additives.

The light shield pattern 24 located on the base member 22 may serve to shield or diffuse light to prevent a bright line that may be generated at the boundary of the neighboring light emitting units 10. The light shield pattern 24 may have various shapes and arrangements to intercept and diffuse light at a portion where a bright line may occur, in order to achieve uniform light diffusion. The shape and arrangement of the light shield pattern 24 will be described later in greater detail with reference to FIGS. 3 and 4.

In consideration of the fact that the light shield connection film 20 is located at the boundary of the neighboring light emitting units 10 where a large difference in brightness occurs, the light shield pattern 24 may take the form of a stack of multiple layers. For instance, the light shield pattern 24 may include a first layer 24a, a second layer 24b, and a third layer 24c sequentially stacked on the base member 22. However, the present disclosure is not limited thereto. If a bright line generated at the boundary of the neighboring light emitting units 10 has a low intensity, the light shield pattern 24 may include only the first layer 24a, or may include only the first layer 24a and the second layer 24b, for example.

A stacking configuration of the first to third layers 24a, 24b, and 24c, a constituent material and thickness of each layer, and the like, may be changed according to the intensity of a bright line, the type of the light emitting units 10, and the like. For instance, if the intensity of a bright line or bright spot is not great, all of the first to third layers 24a, 24b, and 24c may include only a white pigment. If the intensity of a bright line or bright point is great, the first layer 24a may include a white pigment, the second layer 24b may include a white pigment and a blue pigment, and the third layer 24c may include metal particles or metal-compound particles. The blue pigment may enhance light shielding efficiency and correct yellow shift due to a white pigment. If the third layer 24c contains metal particles or metal-compound particles, the intensity of a bright spot or bright line may be greatly reduced. The light shield pattern 24 or light diffusing material may be formed using various methods, including double tone printing, or the like, or may be provided as layers of film. It should be appreciated that the present disclosure is not limited thereto, and various other alterations in structure, form, shape or manufacturing methods are possible.

As the above-described light shield pattern 24 acts to shield a bright line or bright spots generated at the boundary of the neighboring light emitting units 10, the light emitting module 100 including the plurality of light emitting units 10 may achieve a more uniform light emission.

The adhesive member 26 may serve to attach the light shield connection film 20 to the light emitting unit 10. The adhesive member 26 may be formed of various known materials. For example, the adhesive member 26 may be formed of a PSA. The adhesive member 26 may have a shape and arrangement to stably attach the light shield connection film 20 to the light emitting unit 10. This will be described later in greater detail with reference to FIGS. 3 and 4.

The light emitting units 10 may include the first to fourth light emitting units 11, 12, 13, and 14 constituting two rows and two columns. Accordingly, boundaries between the first to fourth light emitting units 11, 12, 13, and 14 include a boundary extending in a first direction (e.g., a row direction or a horizontal direction with respect to the drawing) between the two rows, and a boundary extending in a second direction (e.g., a column direction or a vertical direction with respect to the drawing) between the two columns. With this configuration, the light shield connection film 20 according to the present embodiment may include a first light shield portion 202 formed in a row direction to connect the light emitting units 10 of two rows and a second light shield portion 204 formed in a column direction to connect the light emitting units 10 of two columns. Here, the first light shield portion 202 and the second light shield portion 204 may be integrally connected to each other such that the light shield connection film 20 has a cross shape. More specifically, the base member 22 of the light shield connection film 20 may have a cross shape to correspond to the first and second light shield portions 202 and 204 located at the boundaries of the first to fourth light emitting units 11, 12, 13, and 14, and in turn the light shield pattern 24 and the adhesive member 26 may be located on the cross-shaped base member 22. With this configuration, once the light shield connection film 20 has been positioned on the boundaries of the first to fourth light emitting units 11, 12, 13, and 14, the light shield connection film 20 may be bonded to the first to fourth light emitting units 11, 12, 13, and 14 using the adhesive member 26. In this way, it is possible to minimize the area of the light shield connection film 20 and to achieve simplified positioning of the light shield connection film 20 on the boundaries of the first to fourth light emitting units 11, 12, 13, and 14. Such configurations may also provide added structural strength to the light shield connection film 20 to structurally support the first to fourth light emitting units 11, 12, 13, and 14.

In this case, first and second alignment marks 10a and 20a may be located at corresponding portions of the light emitting unit 10 and the light shield connection film 20, respectively. Accordingly, as the light shield connection film 20 is attached to the light emitting unit 10 in a state in which the first alignment mark 10a of the light emitting unit 10 is aligned with the second alignment mark 20a of the light shield connection film 20, easier attachment between the light shield connection film 20 and the light emitting unit 10 may be accomplished with excellent alignment accuracy. The first and second alignment marks 10a and 20a may be acquired via application of a separate material, intaglio removal of a partial region, or various other methods.

However, the present disclosure is not limited to the above description. Various other alterations are possible, in which the first light shield portion 202 and the second light shield portion 204 are formed as separate portions, for example. This will be described later in greater detail with reference to FIGS. 5 to 7.

The shape and the arrangement of the light shield pattern 24 and the adhesive member 26 of the light shield connection film 20 as described above will now be described in greater detail with reference to FIGS. 3 and 4.

Figure 3:
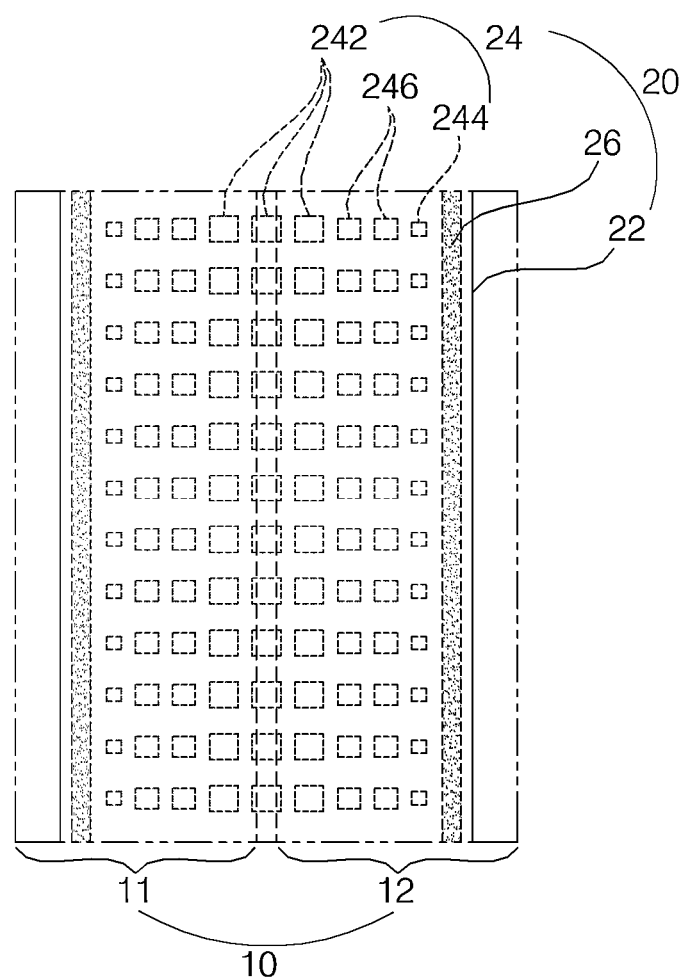
FIG. 3 is an enlarged-scale plan view of portion A of FIG. 1.
Figure 4:
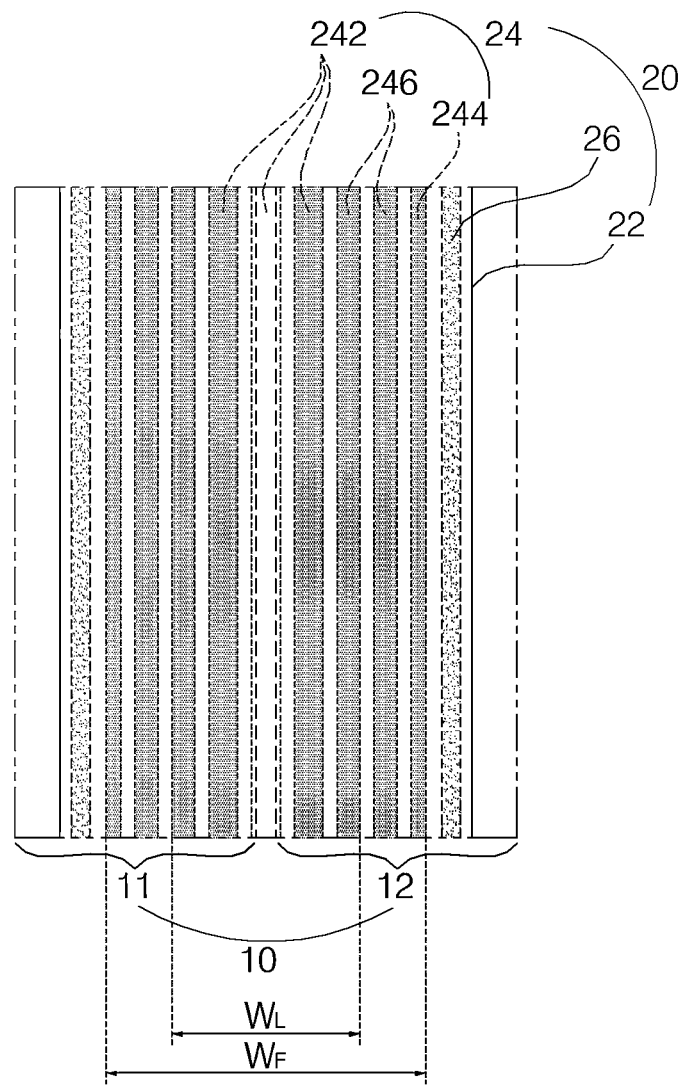
FIG. 4 is an enlarged-scale plan view of portion A of FIG. 1 according to another example.

FIG. 3 is an enlarged-scale plan view of portion A of FIG. 1, and FIG. 4 is an enlarged-scale plan view of portion A of FIG. 1 according to another example. Referring to FIG. 3, the light shield pattern 24 of the light shield connection film 20 is illustrated as including a plurality of dots. Although the drawing illustrates the light shield pattern 24 including square dots, the present disclosure is not limited thereto. Accordingly, the light shield pattern 24 may include various other polygonal dots, such as triangular, diamond-shaped, and hexagonal dots, or may include circular, elliptical, or non-uniform dots.

Here, the light shield pattern 24 may include a first pattern portion 242 located proximate to the boundary of the neighboring light emitting units 10 and a second pattern portion 244 distant from the boundary and located at the edge of the light shield connection film 20. The first pattern portion 242 and the second pattern portion 244 may have different characteristics. In FIG. 3, the neighboring light emitting units 10 may include the first light emitting unit 11 and the second light emitting unit 12, and the following description illustrates the first light emitting unit 11 and the second light emitting unit 12 by way of example. However, the present disclosure is not limited thereto, and may be applied to all of the neighboring light emitting units 10.

The first pattern portion 242 may be located proximate to the boundary of the first light emitting unit 11 and the second light emitting unit 12 (e.g., a central region between two light emitting units) where high brightness occurs, and therefore needs to more effectively shield light. On the other hand, the second pattern portion 244 is distant from the boundary of the first light emitting unit 11 and the second light emitting unit 12. In other words, the second pattern portion 244 is located at a location where a brightness difference is less than that in a location of the first pattern portion 242. Therefore, the second pattern portion 244 is under less strain for light shielding and diffusion. Accordingly, the first pattern portion 242 may have a greater size than the second pattern portion 244, and may have a greater density than the second pattern portion 244. In this way, it is possible to achieve more uniform brightness at the boundary of the first light emitting unit 11 and the second light emitting unit 12.

In this case, a third pattern portion 246 may be located between the first pattern portion 242 and the second pattern portion 244. The third pattern portion 246 may have a size and/or density less than the first pattern portion 242 and greater than the second pattern portion 244. In this way, the size and/or density of the light shield pattern 24 may be gradually reduced with increasing distance from the boundary of the first light emitting unit 11 and the second light emitting unit 12, which may maximize brightness uniformity at the boundary.

Although the above description and the drawing illustrate adjustment in the size and density of the first to third pattern portions 242, 244, and 246 in order to more uniformly diffuse light within the light shield pattern 24, the present disclosure is not limited thereto. For instance, the first pattern portion 242 may have a greater thickness than the second pattern portion 244, so as to achieve greater light shielding/diffusing effects. In this case, at least one of the first to third layers (see reference numerals 24a, 24b, and 24c of FIG. 2) of the first pattern portion 242 may have a greater size than a corresponding one of the first to third layers 24a, 24b, and 24c of the second pattern portion 244, so as to achieve greater light shielding effects.

Alternatively, the concentration (or quantity) of a light shield material included in the first pattern portion 242 may be greater than the concentration (or quantity) of a light shield material included in the second pattern portion 244, in order to achieve greater light shielding effects. In this case, further enhancement in light shielding effects may be accomplished when the concentration of the light shield material included in at least one of the first to third layers 24a, 24b, and 24c of the first pattern portion 242 is greater than the concentration of a corresponding one of the first to third layers 24a, 24b, and 24c of the second pattern portion 244. The thickness of the third pattern portion 246 and the concentration (or quantity) of the light shield material may have intermediate values between those of the first pattern portion 242 and the second pattern portion 244. It should be appreciated that various other methods and configurations may be used.

The adhesive member 26 may be located at the outside of the second pattern portion 244, e.g., at a location proximate to the edge of the light shield connection film 20 (more particularly, the edge of the base member 22). In this case, the adhesive member 26 may be located to extend, lengthwise, along both edges of the light shield connection film 20. This may achieve sufficient adhesive force between the first and second light emitting units 11 and 12 while minimizing the application area, thereby allowing the light shield connection film 20 to be stably secured. However, the present disclosure is not limited thereto. Accordingly, the adhesive member 26 may be located on the light shield pattern 24, and various other alterations are possible.

The above description and the drawing illustrate the light shield pattern 24 having a dot shape. However, as previously noted, the present disclosure is not limited thereto, and the light shield pattern 24 may have various shapes other than the dot shape such as a rectangular, triangular, circular, or another applicable shape. Moreover, as exemplarily shown in FIG. 4, the light shield pattern 24 may have a stripe shape.

Referring to FIG. 4, the first pattern portion 242 of the light shield pattern 24 proximate to the boundary may have a greater size (e.g., a greater line width) than the second pattern portion 244 proximate to the edge and distant from the boundary. In addition, the third pattern portion 246, which has a size (e.g., line width) less than the first pattern portion 242 and greater than the second pattern portion 244, may be located between the first pattern portion 242 and the second pattern portion 244. With this configuration, the width of the light shield pattern 24 may be gradually reduced from a pattern portion proximate to the boundary to a pattern portion distant from the boundary. In this way, it is possible to effectively eliminate a difference in brightness that may occur in the light shield connection film 20.

In this case, a ratio of the width of a bright line $W_L$ generated in the light emitting module 100 to the width $W_F$ of the light shield connection film 20, more particularly, two outermost light shield patterns 24 (e.g., a distance between outermost edges of the two second pattern portions 244) may be within a range of 1:1 to 1:2. Here, the bright line refers to a line that has a brightness difference greater than 1% and which may be perceived by a viewer, and the width of the bright line refers to the width of a portion where a brightness difference with respect to other regions of the light panels is greater than 1%. The width of the bright line may be identified in a state in which the light shield connection film 20 is removed. If the ratio is less than 1:1, it may be difficult to sufficiently shield the bright line. If the ratio exceeds 1:2, the light shield pattern 24 may be excessively wide, thus shielding light even in a region where no bright line is present. Accordingly, the ratio may be within a range of 1:1.2 to 1:1.8 in consideration of efficient shielding of the bright line. However, the present disclosure is not limited thereto.

Moreover, owing to the light shield connection film 20, the light emitting module 100 including the plurality of light emitting units 10 may achieve uniform brightness. That is, traditionally, a method of increasing the size of a light emitting unit has mainly been used to fabricate a larger light emitting module 100, and therefore increases in the size of the light emitting module 100 may be limited. Moreover, in the case in which the light emitting module 100 is fabricated by connecting the plurality of light emitting units 10 to one another, high brightness occurs in boundaries of the plurality of light emitting units 10, thus causing bright lines or uneven brightness visible to a viewer.

On the other hand, as broadly described and embodied herein, as a result of locating the light shield connection film 20 at the boundaries of the plurality of light emitting units 10 to minimize a brightness difference that may occur in the boundaries, the entire light emitting module 100 including the plurality of light emitting units 10 may achieve uniform light emission. Thereby, since a single light emitting module 100 may be fabricated by connecting the plurality of light emitting units 10 to one another, a light emitting module having a considerably greater surface area than the light emitting unit 10 may be fabricated. For instance, if four light emitting units 10, each having a size of 50 inches or more, are connected to one another to construct the light emitting module 100, the light emitting module 100 having a size of 100 inches or more may be fabricated. Moreover, the resulting light emitting module 100 may exhibit excellent light uniformity. Accordingly, it is possible to easily fabricate the light emitting module 100 having a greater surface area than each of the light emitting units 10 and excellent light uniformity even without replacement of equipment or changes in manufacturing processes. The light shield connection film 20 may also serve to secure the plurality of light emitting units 10, thereby providing enhanced structural stability.

Hereinafter, the light shield connection film and the light emitting module including the same according to another example will be described in detail. A detailed description with respect to the same or similar components as or to the previously described components of the above description will be omitted, and only differences therebetween will be described hereinafter in detail.

Figure 5:
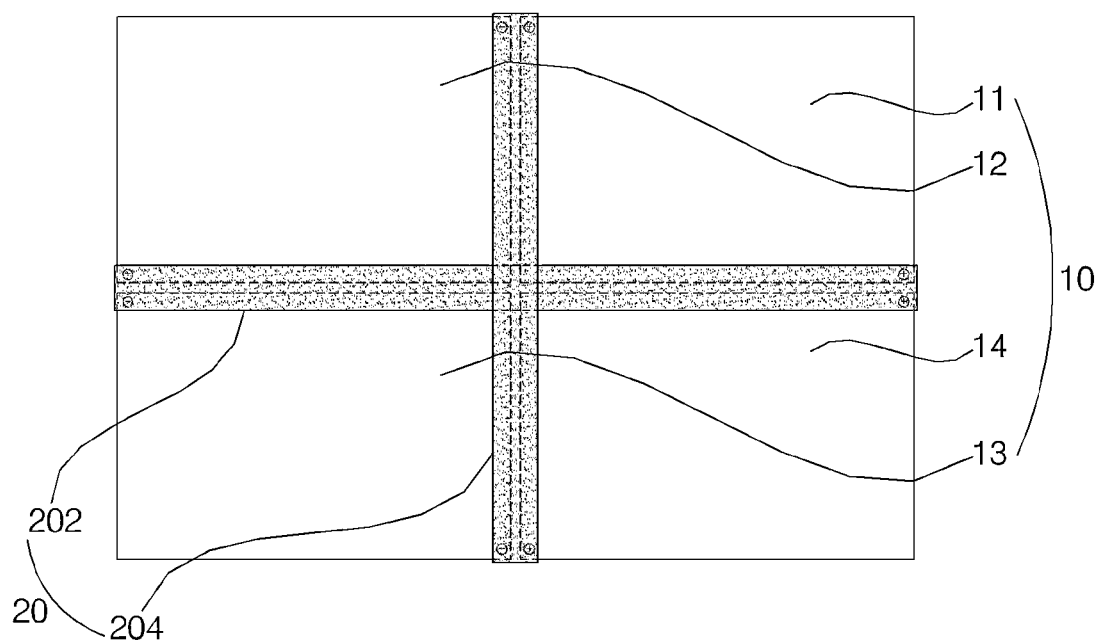
FIG. 5 is a plan view showing a light emitting module including a light shield connection film.

FIG. 5 is a plan view showing a light emitting module including a light shield connection film according to another embodiment of the present disclosure. The first light shield portion 202 and the second light shield portion 204 constituting the light shield connection film 20 may be separately provided. More specifically, each of the first light shield portion 202 and the second light shield portion 204 may include an elongated linear base member (see reference numeral 22 in FIGS. 2 and 3), a light shield pattern (see reference numeral 24 in FIGS. 2 and 3) formed on the base member, and an adhesive member (see reference numeral 26 in FIGS. 2 and 3). The light shield connection film 20 including the first light shield portion 202 and the second light shield portion 204 may be formed by attaching the first light shield portion 202 to the light emitting unit 10 in a row direction, and then attaching the second light shield portion 204 to the light emitting unit 10 in a column direction. Although the drawing illustrates that the second light shield portion 204 is located above the first light shield portion 202, the second light shield portion 204 may be located below the first light shield portion 202 when the second light shield portion 204 is first attached, and then the first light shield portion 202 is attached.

As described above, when the first light shield portion 202 and the second light shield portion 204 have a linear shape, the resulting light shield connection film 20 may be freely applied to various configurations and shapes of the light emitting module 100. In addition, for example, time and costs required to align and attach the light shield connection film 20 may be reduced.

Figure 6:
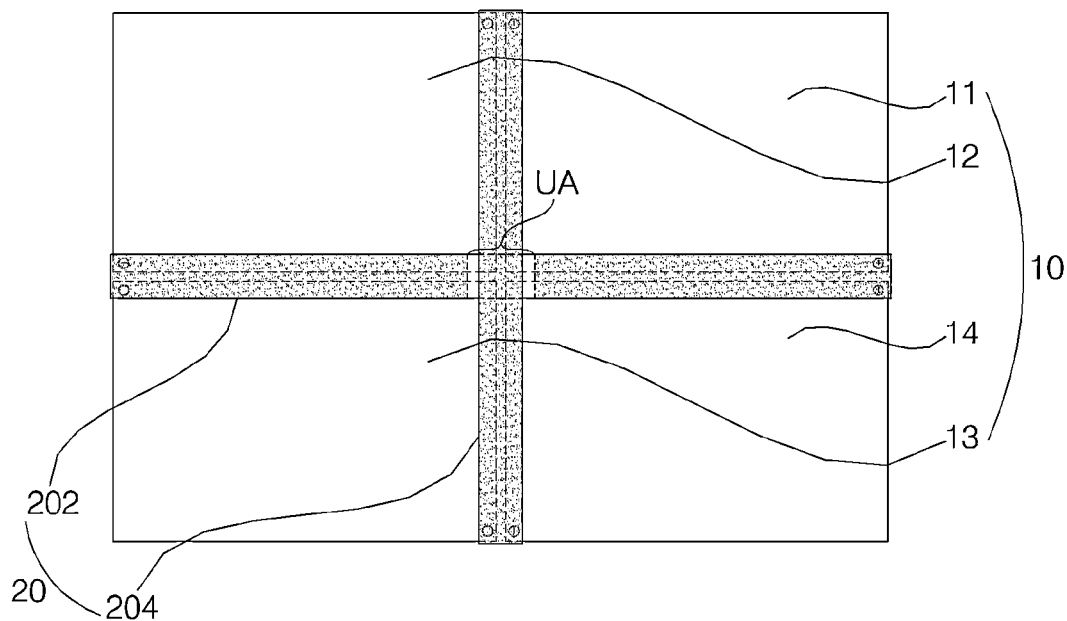
FIG. 6 is a plan view showing a light emitting module including a light shield connection film according to another example.

FIG. 6 is a plan view showing a light emitting module including a light shield connection film according to another example of the present disclosure. The first light shield portion 202 and the second light shield portion 204 constituting the light shield connection film 20 may be separately provided, similar to FIG. 5. In this case, however, an intersection of the first light shield portion 202 and the second light shield portion 204 may be provided with a light shield pattern unformed area UA, where the base member 22 is present but the light shield pattern 24 is not formed. Although the drawing illustrates the light shield pattern unformed area UA as being located on the first light shield pattern 202, the light shield pattern unformed area UA may be located on the second light shield pattern 204.

If the light shield pattern unformed area UA is located on any one light shield portion at the intersection of the first light shield portion 202 and the second light shield portion 204, the light shield pattern 24 is formed only on the other light shield portion at a region where the first light shield portion 202 and the second light shield portion 204 overlap each other. This may prevent brightness deterioration caused by overlap of the light shield pattern 24. In this way, more uniform emission of light from the light emitting module 100 may be accomplished.

Figure 7:
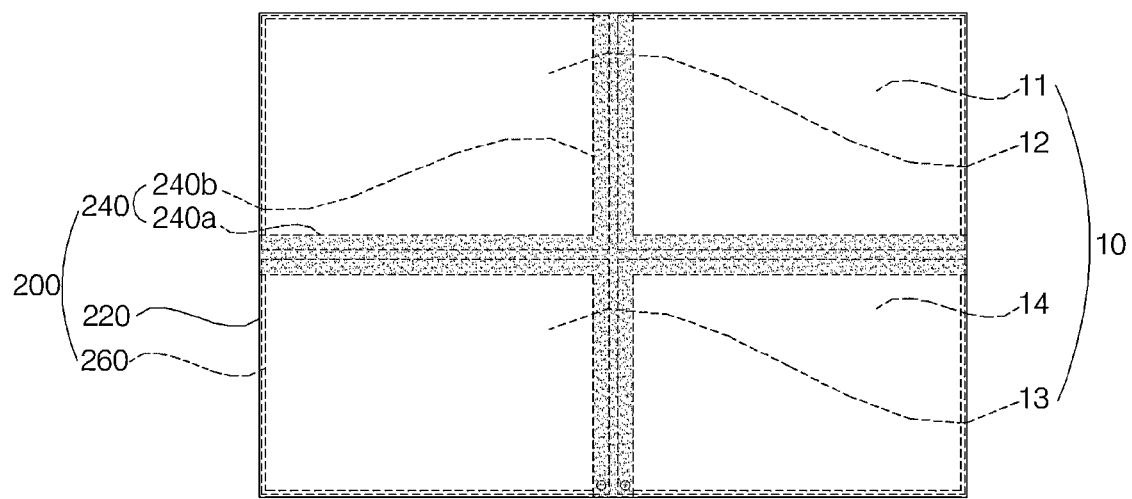
FIG. 7 is a plan view showing a light emitting module including a light shield connection film according to another example.

FIG. 7 is a plan view showing a light emitting module including a light shield connection film according to another example of the present disclosure. The base member 220 of the light shield connection film 200 may be configured to cover the entire light emitting module 100, and the light shield pattern 240 may include a first light shield pattern portion 240a formed in a row direction to cover an interface (or gap) between a plurality of light emitting units defining a plurality of rows, and a second light shield pattern portion 240b formed in a column direction to cover an interface (or gap) between a plurality of light emitting units defining a plurality of columns. In this case, as the base member 220 may be configured as an optical film (e.g., an anti-reflection film), the resulting light shield connection film 200 may also serve as an optical film. An adhesive member 260 may be provided around the outer edge of the base member 220 corresponding to the outer edge of the light emitting module 100. The adhesive member 260 may also be provided along the edge of the light shield patterns 240a and 240b. The adhesive member 260 may be provided to not overlap the light shield pattern 240. For example, the adhesive member 260 may be omitted in regions overlapping the light shield pattern 240 at the outer edges of the light emitting module 100. However, the present disclosure is not limited thereto. Thus, a part of the adhesive member 260 may be provided to overlap the light shield pattern 240. In addition, as the base member 20 also serves to connect the front surfaces of the light emitting units 10, the light emitting units 10 may achieve enhanced structural stability.

Figure 8:
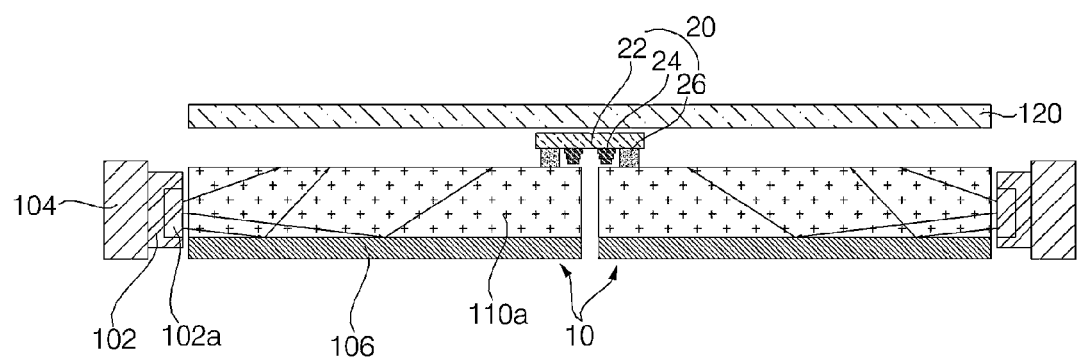
FIG. 8 is a sectional view showing a light emitting module including a light shield connection film according to another example.

FIG. 8 is a sectional view showing a light emitting module including a light shield connection film according to a further embodiment of the present disclosure. The light emitting module may be a lateral type light emitting module in which the light emitting device 102 and the circuit board 104 connected to the light emitting device 102 are located at a lateral surface of a light guide plate 110a. The light guide plate 110a may be formed of various materials to achieve light diffusion via total reflection. For example, the light guide plate 110a may be formed of a thermosetting resin material, such as polymethylmethacrylate (PMMA), polycarbonate (PC), or the like.

A bezel 102a may be located to surround the light emitting device 102 and a light shield sheet (see reference numeral 112 in FIG. 2) may be omitted. However, the present disclosure is not limited thereto. In addition, in the drawing, merely for purposes of brief and clear explanation, an adhesive layer (see reference numeral 116 in FIG. 2) and a case (see reference numeral 118 in FIG. 2) which are used to secure a rear surface of the light emitting unit 10 are not illustrated, but may be provided. Moreover, various configurations of the light emitting units 10 may be applied to the light emitting module according to the present embodiment.

Hereinafter, the light shield connection film and the light emitting module including the same will be described in greater detail with reference to experimental examples. The experimental examples are given by way of example for explanation of the present disclosure, but the present disclosure is not limited thereto.

Figure 9A:
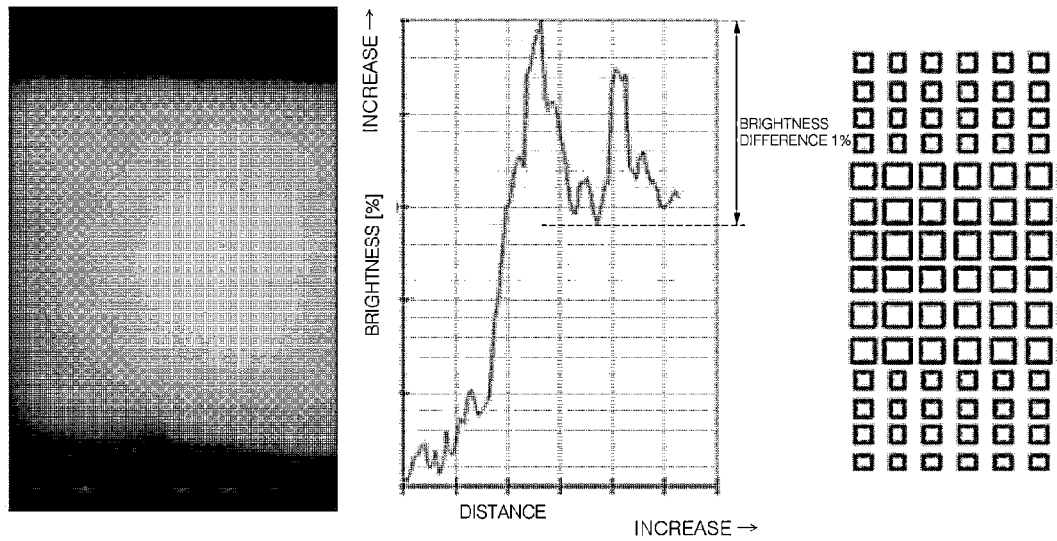
FIGS. 9A to 9C are views illustrating a brightness of light at a boundary of light emitting units according to experimental examples.

Referring to FIG. 9A, in a first experimental example, a light shield connection film having a width of 5 mm was attached to a boundary of two neighboring light emitting units which adjoin each other. A photograph of the boundary of the light emitting units in a light emission state, a brightness graph thereof, and a schematic shape of a light shield pattern of the light shield connection film are illustrated in FIG. 9A.

Figure 9B:
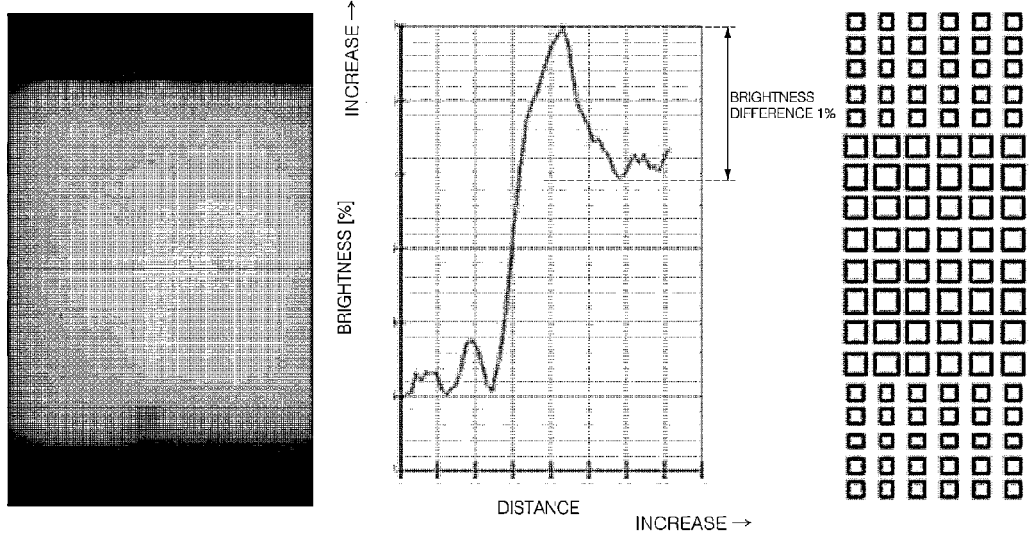

Referring to FIG. 9B, in a second experimental example, a light shield connection film having a width of 7 mm was attached to a boundary of two neighboring light emitting units which adjoin each other. A photograph of the boundary of the light emitting units in a light emission state, a brightness graph thereof, and a schematic shape of a light shield pattern of the light shield connection film are illustrated in FIG. 9B.

Figure 9C:
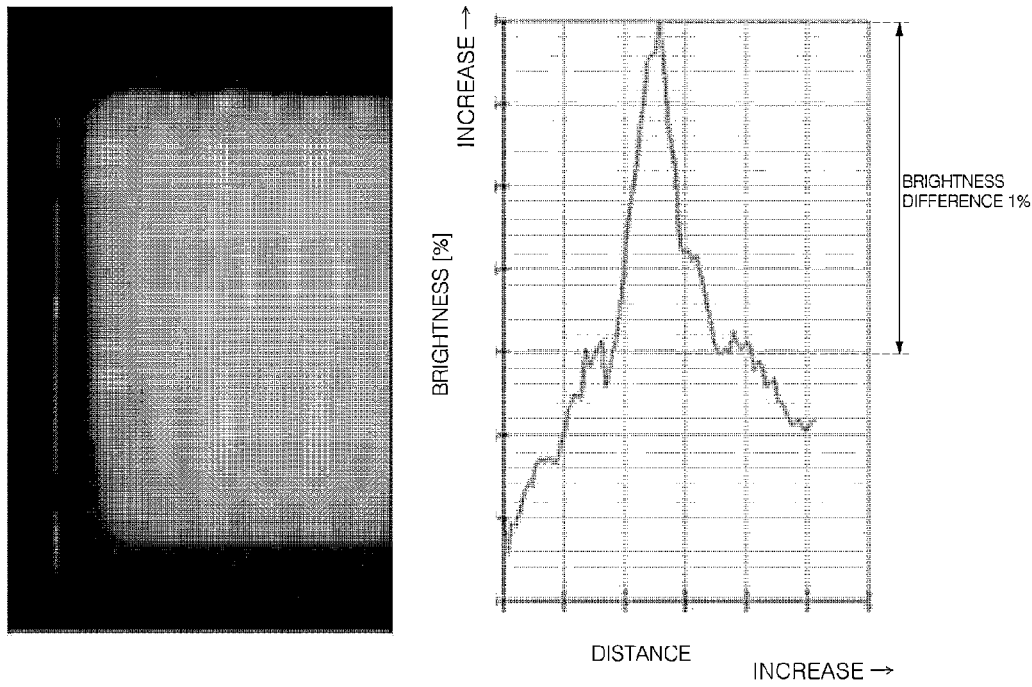

FIG. 9C shows a photograph of a boundary of two neighboring light emitting units, which adjoin each other, in a light emission state and a brightness graph thereof. That is, FIG. 9C illustrates light emission characteristics without the light shield connection film of the present disclosure.

As exemplarily shown in FIGS. 9A and 9B, in the experimental examples 1 and 2, the boundary of the neighboring light emitting units has a brightness difference within 1%, whereas in the comparative example as exemplarily shown in FIG. 9C, the boundary of the neighboring light emitting units has a brightness difference of 2% which may be visible to a viewer. That is, when using the light shield connection films according to the experimental examples 1 and 2, it is possible to remarkably reduce a difference in brightness at the boundary such that the user cannot perceive the brightness difference.

As is apparent from the above description, according to the embodiments, a light shield connection film is located at boundaries of a plurality of light emitting units to minimize a brightness difference that may occur at the boundaries. This may ensure uniform light emission throughout a light emitting module including the plurality of light emitting units. Accordingly, a light emitting module, which has a greater area than the light emitting unit as well as excellent light uniformity, may be easily fabricated without replacement of facilities or change of process lines.

It is an object of the present disclosure to provide a light shield connection film which may prevent bright lines from being generated at boundaries of neighboring light emitting units. It is another object of the present disclosure to provide a light emitting module having a large area and excellent light uniformity.

In accordance with one aspect of the present disclosure, the above and other objects can be accomplished by the provision of a light emitting module including a plurality of light emitting units including a first light emitting unit and a second light emitting unit, which neighbor one another, and a light shield connection film located at least at a boundary of the first light emitting unit and the second light emitting unit to interconnect the first and second light emitting units, thereby shielding a bright line that is generated at the boundary.

The light shield connection film may include a base member and a light shield pattern located on the base member.

The light shield pattern may include a first pattern portion proximate to the boundary of the first light emitting unit and the second light emitting unit, and a second pattern portion distant from the boundary. The first pattern portion and the second pattern portion may have a difference in terms of at least one of a size, a density, a thickness, and a quantity of a light shield material.

The size of the first pattern portion may be greater than the size of the second pattern portion.

The density of the first pattern portion may be greater than the density of the second pattern portion.

The thickness of the first pattern portion may be greater than the thickness of the second pattern portion.

The quantity of the light shield material of the first pattern portion may be greater than the quantity of the light shield material of the second pattern portion.

The base member may have a shape corresponding to the boundary of the first light emitting unit and the second light emitting unit, or the light shield pattern may be formed at a position corresponding to the boundary of the first light emitting unit and the second light emitting unit.

The light shield pattern may include a first layer placed on the base member, a second layer placed on the first layer, and a third layer placed on the second layer. The first layer may contain a white pigment, the second layer may contain a white pigment and a blue pigment, and the third layer may contain metal particles or metal-compound particles.

The light shield pattern may include a plurality of dots, or may have a strip shape.

The light shield connection film may further include an adhesive member for attachment to the light emitting unit, placed on the base member.

The light emitting unit may be provided with a first alignment mark at the boundary, and the light shield connection film may be provided with a second alignment mark corresponding to the first alignment mark.

A ratio of a width of the bright line generated in the light emitting module to a width of the light shield connection film may be within a range of 1:1 to 1:2.

The ratio of the width of the bright line generated in the light emitting module to the width of the light shield connection film may be within a range of 1:1.2 to 1:1.8.

The plurality of light emitting units may define a plurality of rows and a plurality of columns. The light shield connection film may include a first light shield portion formed in a row direction to connect the plurality of light emitting units defining the plurality of rows, and a second light shield portion formed in a column direction to connect the plurality of light emitting units defining the plurality of columns.

The first light shield portion and the second light shield portion may be integrally formed with each other such that the light shield connection film has a cross shape.

The first light shield portion and the second light shield portion may be separately formed, and the second light shield portion may be located above or below the first light shield portion.

The light shield pattern may be not formed on at least one of the first light shield portion and the second light shield portion at an intersection of the first and second light shield portions.

The light shield connection film may include a base member and a light shield pattern located on the base member. The base member may be configured to cover the entire light emitting module, and the light shield pattern may be located at a position corresponding to the boundary.

The light shield pattern may include a first light shield pattern portion formed in a row direction to connect the plurality of light emitting units defining the plurality of rows, and a second light shield pattern portion formed in a column direction to connect the plurality of light emitting units defining the plurality of columns.

In accordance with another aspect of the present disclosure, there is provided a light shield connection film located at a boundary of a first light emitting unit and a second light emitting unit, which neighbor one another, to interconnect the first and second light emitting units, thereby shielding a bright line that is generated at the boundary, the light shield connection film including a base member and a light shield pattern located on the base member.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device, comprising:
   a first light panel;
   a second light panel provided adjacent to the first light panel such that a first side surface of the first light panel faces a second side surface of the second light panel; and
   a diffuser provided over a boundary region where the first side surface and the second side surface face each other to diffuse light between the first and second light panels, the diffuser having a base plate with at least one light diffusing material to form light blocking regions arranged in a prescribed pattern to diffuse the light,
   wherein the light diffusion material includes:
      a first light diffusion material provided at a middle region of the base plate; and
      a second light diffusion material provided at outer regions of the base plate.

2. The lighting device of claim 1, wherein the first panel is substantially coplanar to the second panel and provided a prescribed distance from the second panel.

3. The lighting device of claim 1, wherein the base plate is fixed to the first and second light panels to provide structural support for the light emitting module, the base plate having a prescribed amount of strength to fix the first and second light panels to each other.

4. The lighting device of claim 1, wherein the first light diffusion material is arranged to have a first pattern and the second light diffusion material is arranged to have a second pattern, the first pattern being configured to diffuse a greater amount of light than the second pattern, and wherein at least one of a size, a density, a thickness, or a quantity of the light diffusion material of the first pattern is different than that of the second pattern.

5. The lighting device of claim 1, wherein the base plate has a prescribed shape that corresponds to the first light panel and the second light panel, and the light diffusing material has a prescribed shape that corresponds to a shape of the boundary region along the first light panel and the second light panel, wherein
   the prescribed shape of the base plate corresponds to the shape of the boundary region along the first and second light panels or a shape of an outer circumference of both the first and second light panels.

6. The lighting device of claim 1, wherein the light diffusing material includes a first layer provided on the base plate, a second layer provided on the first layer, and a third layer provided on the second layer,
   wherein the first layer includes a white pigment, the second layer includes a white pigment and a blue pigment, and the third layer includes metal particles or metal-compound particles.

7. The lighting device of claim 1, wherein the light diffusing material is provided to form the prescribed pattern that includes a plurality of dots or at least one strip.

8. The lighting device according to claim 1, wherein the diffuser includes at least one adhesive member provided between the base plate and the first and second light panels to fix the first light panel to the second light panel.

9. The lighting device of claim 1, wherein the diffuser includes a first alignment mark and the light panels include a second alignment mark, the first and second alignment marks positioned to correspond to each other.

10. The lighting device of claim 1, wherein a ratio of a width of a prescribed region at the boundary region between the first and second light panels to a width of the light blocking regions is between 1:1 to 1:2,
   wherein the prescribed region is a region corresponding to the boundary region having a brightness greater than a brightness of the first or second light panels by a prescribed amount.

11. The lighting device of claim 10, wherein the ratio of the width of the prescribed region to the width of the light blocking regions is between 1:1.2 to 1:1.8.

12. The lighting device of claim 1, wherein a plurality of light panels are provided to form a plurality of rows and a plurality of columns of light panels, and
   wherein the diffuser includes a first portion provided over a gap between two rows of light panels, and a second portion provided over a gap between two columns of light panels.

13. The lighting device of claim 12, wherein the first and second portions of the diffuser are integrally formed with each other such that the diffuser has a cross shape.

14. The lighting device of claim 12, wherein the first and second portions of the diffuser are separately formed from each other and are provided to overlap each other.

15. The lighting device according to claim 14, wherein the light blocking region is not provided on one of the first or second portions of the diffuser in a region in which the first and second portions overlap.

16. The lighting device of claim 1, wherein the diffuser is a translucent film.

17. A lighting device, comprising:
   a first light panel;

a second light panel provided adjacent to the first light panel such that a first side surface of the first light panel faces a second side surface of the second light panel; and a diffuser provided over a boundary region where the first side surface and the second side surface face each other to diffuse light between the first and second light panels, wherein the diffuser includes a base plate with at least one light diffusing material to form light blocking regions arranged in a prescribed pattern to diffuse the light a prescribed amount near the boundary region, wherein the diffuser is fixed to the first and second light panels to provide structural support between the first and second light panels, wherein the light diffusion material includes:
 a first light diffusion material provided at a middle region of the base plate; and
 a second light diffusion material provided at outer regions of the base plate.

18. A diffuser for a lighting device, comprising:
a base plate provided over a boundary region where a first side surface of a first light panel faces a second side surface of a second light panel adjacent to the first light panel;

at least one light diffusing material provided on the base plate; and at least one adhesive member provided on the base plate to fix the base plate over the boundary region, wherein the at least one light diffusing material is arranged to have a prescribed pattern to diffuse light a prescribed amount over the boundary region, and wherein the light diffusion material includes:
 a first light diffusion material provided at a middle region of the base plate; and
 a second light diffusion material provided at outer regions of the base plate.

19. The lighting device of claim 1, wherein the light diffusion material includes a third light diffusion material arranged to have a third pattern and located between the first light diffusion material and the second light diffusion material, the third light diffusion material of the third pattern having a size and/or density less than the first light diffusion material of the first pattern and greater than the second light diffusion material of the second pattern.

20. The lighting device of claim 1, wherein the size and/or density of the light diffusion material is gradually reduced with increasing distance away from the middle region of boundary region between the first and second light panels.

* * * * *